United States Patent
Varty et al.

(10) Patent No.: US 7,296,468 B2
(45) Date of Patent: *Nov. 20, 2007

(54) DIGITAL CORIOLIS GYROSCOPE

(75) Inventors: Guy Thomas Varty, Woodland Hills, CA (US); Anthony Matthews, South Weber, CA (US)

(73) Assignee: Litton Systems, Inc., Los Angeles, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/258,780

(22) Filed: Oct. 26, 2005

(65) Prior Publication Data

US 2007/0089509 A1   Apr. 26, 2007

(51) Int. Cl.
    *G01P 9/04* (2006.01)
(52) U.S. Cl. .................. 73/504.12; 73/504.13
(58) Field of Classification Search ............. 73/504.12, 73/504.13, 510
    See application file for complete search history.

(56) References Cited

U.S. PATENT DOCUMENTS

| | | | |
|---|---|---|---|
| 3,625,067 A | 12/1971 | Emslie | |
| 3,656,354 A | 4/1972 | Lynch | |
| 3,678,762 A | 7/1972 | Denis | |
| 3,719,074 A | 3/1973 | Lynch | |
| 4,157,041 A | 6/1979 | Loper, Jr. et al. | |
| 4,951,508 A | 8/1990 | Loper, Jr. et al. | |
| 5,763,780 A | 6/1998 | Matthews et al. | |
| 5,801,310 A | 9/1998 | Matthews et al. | |
| 5,892,152 A | 4/1999 | Darling et al. | |
| 5,902,930 A | 5/1999 | Matthews et al. | |
| 5,983,719 A | 11/1999 | Matthews et al. | |
| 6,065,340 A | 5/2000 | Matthews et al. | |
| 6,079,270 A | 6/2000 | Matthews et al. | |
| 6,158,282 A | 12/2000 | Matthews et al. | |
| 6,565,395 B1 | 5/2003 | Schwarz | |
| 6,619,121 B1 | 9/2003 | Stewart et al. | |
| 6,880,400 B1 * | 4/2005 | Fogliatti et al. | 73/504.12 |
| 6,883,361 B2 | 4/2005 | Wyse | |
| 6,964,195 B2 * | 11/2005 | Hobbs et al. | 73/504.14 |

OTHER PUBLICATIONS

Zarabade et al., "A Resonating Comb/Ring Angular Rate Sensor Vacuum Packaged Via Wafer Bonding", Sensors and Actuators (1999).

Lohning et al., "Digital Down Conversion in Software Radio Terminals" (Sep. 2000).

* cited by examiner

*Primary Examiner*—John E. Chapman

(57) ABSTRACT

Apparatus, systems, and methods to control the frequency of a plurality of gyroscopes are disclosed. The gyroscopes are configured such that each individual gyroscope operates independently of one another and at the same pre-determined frequency. To accomplish this, the natural frequency of each gyroscope is determined, and a reference signal is added to the output signal of its respective gyroscope such that the sum of the natural frequency and the reference signal frequency equals the pre-determined frequency. Thus, each individual gyroscope, though it may include its own individual natural frequency, operates autonomously at the predetermined frequency.

7 Claims, 6 Drawing Sheets

DIGITAL CORIOLIS GYROSCOPE

BACKGROUND OF THE INVENTION

1. Field of the Invention

The present invention relates generally to improvements in gyroscopes, and more particularly to, hemispherical resonator gyroscopes (HRGs).

2. Description of the Related Art

A hemispherical resonator gyroscope (HRG) is a vibratory sensor that includes a hemispherical resonator. Examples of HRGs can be found in U.S. Pat. Nos. 3,625,067, 3,656,354, 3,678,762, 3,719,074, 4,157,041, 4,951,508, 5,763,780, 5,801,310, 5,892,152, 5,902,930, 5,983,719, 6,065,340, 6,079,270, 6,158,282, 6,565,395, 6,619,121, and 6,883,361, each of which is hereby incorporated, in its entirety, by reference.

A main component of each HRG is a quartz high Q resonator. This resonator is driven into oscillation by application of electrostatic forcers that are synchronized to the individual natural frequency of the resonator. Since each individual resonator includes its own individual natural frequency, the frequency is often referred to as "4.xx kHz", which is approximately 4.1 kHz for a 30 millimeter diameter resonator. For example, a first resonator may include a natural frequency of 4.07 kHz, while a second resonator includes a natural frequency of 4.13 kHz.

The electrostatic forcers cause the resonator to flex in an elliptical mode of oscillation. A set of readout electrodes arranged around the resonator are used to sense the amplitude, location, and motion of the elliptical mode standing wave pattern (the flex wave) resulting from such oscillation. If the HRG is rotated, the angle of rotation can be determined from processing a signal output by amplifiers attached to the readout electrodes (i.e., by observing changes in the position of the flex wave or actions necessary to prevent changes in the position of the flex wave).

FIG. 1 illustrates an HRG 100 partitioned into four functional segments: a sensor segment 110, a control drive segment 120, a readout segment 130, and a signal processing segment 140. Sensor segment 110 includes a hemispherical resonator 1110, a plurality of drive electrodes 1120, and a plurality of readout electrodes 1130. The plurality of drive electrodes 1120 includes a set of amplitude control drive electrodes 1122, a set of quadrature control drive electrodes 1124, and a set of rate control drive electrodes 1126. The plurality of readout electrodes 1130 includes a set of X-axis readout electrodes 1132, and a set of Y-axis readout electrodes 1134.

Control drive segment 120 is in communication with sensor segment 110 to provide an amplitude control drive signal 1210 to the set of amplitude control drive electrodes 1122, a quadrature control drive signal 1220 to the set of quadrature control drive electrodes 1124, and a rate control drive signal 1230 to the set of rate control drive electrodes 1126. Sensor segment 110 is also in communication readout segment 130 and provides an X readout signal 1310 from X readout electrodes 1132, and a Y readout signal 1320 from Y readout electrodes 1134 to readout segment 130. Readout segment 130 is in communication with signal processing segment 140 to provide signal processing segment 140 with X readout signal 1310 and Y readout signal 1320. X readout signal 1310 is derived from signals provided by X readout electrodes 1132, and Y readout signal 1320 is derived from signals provided by Y readout electrodes 1134. X readout signal 1310 and Y readout signal 1320 are utilized by processing segment 140 to provide an inertial angle output signal 150. X readout signal 1310 and Y readout signal 1320 are also used in processing segment 140 to provide amplitude drive signal 1210, quadrature control drive signal 1220, and rate control drive signal 1230 to control drive unit 120.

Control of HRG 100, and detection of any rotation of HRG 100 are provided by X readout signal 1310 and Y readout signal 1320. Each electrode of X readout electrodes 1132 and Y readout electrodes 1134 provides an electrode readout signal ($S_{ER}$) to readout segment 130. $S_{ER}$ is related to a bias voltage ($V_b$) and to the amplitude (A) of the flex wave, where the relationship can be described using equation (E1) below. In equation (E1), $V_b$ is the bias voltage applied to hemispherical resonator 1110 (which in some instances is metal clad so that its surface is electrically conductive), $\omega_R$ ($\approx 4.1$ kHz) is the natural frequency of hemispherical resonator 1110 of sensor segment 110, A is the amplitude of the flex wave over X readout electrodes 1132 and Y readout electrodes 1134, $\phi$ is a phase offset, and $K_r$ is a proportionality constant.

$$S_{ER} = K_r * V_b [1 - A * \cos(\omega_R t + \phi)] \quad (E1)$$

To operate HRG 100, three types of control forces are applied to hemispherical resonator 1110. These forces correspond to amplitude drive signal 1210, quadrature control drive signal 1220, and rate control drive signal 1230 provided by control drive segment 120. Amplitude drive signal 1210 is used to provide amplitude control of the flex wave and to keep hemispherical resonator 1110 oscillating at or near its natural (resonant) frequency. Quadrature control drive signal 1220 is used to suppress mass and stiffness variations around hemispherical resonator 1110, and rate control drive signal 1230 is used to position the flex wave.

The force applied to hemispherical resonator 1110 by each of the plurality of drive electrodes 1120 is proportional to a direct current (DC) bias voltage $V_b$ maintained on hemispherical resonator 1110. In the case of rate control drive signal 1230 (represented in equation (E2) as $K_d$), the maximum rate that can be applied to the position of the flex wave is a function of the amplitude of the flex wave as shown by equation (E2):

$$S_{RCD} = K_d * V_b * A * \sin(\omega_R t + \phi)] \quad (E2).$$

As such, increasing the bias voltage $V_b$ will increase the magnitude of the electrostatic force applied to hemispherical resonator 1110 by each of the plurality of drive electrodes 1120 (i.e., by amplitude drive signal 1210, quadrature control drive signal 1220, and/or rate control drive signal 1230).

Hemispherical resonator 1110 is a high Q oscillator, the Q being, in some instances, approximately $10*10^6$. To control the flex wave of the oscillating hemispherical resonator 1110, all forces applied via the plurality drive electrodes 1120 must be precisely synchronized and phase locked to the natural frequency ($\omega_R$) of hemispherical resonator 1110. In current HRG 100 devices, during normal operation the various signals all have a frequency at least approximately equal to the natural frequency $\omega_R$ of hemispherical resonator 1110. Phase locking is achieved through the use of a phase locked loop 1410 provided by signal processing segment 140. Phase locked loop 1410 tracks the natural frequency $\omega_R$ of hemispherical resonator 1110 via X readout signal 1310 and Y readout signal 1320 to provide a reference signal for amplitude control loop 1420, quadrature control loop 1430, and rate control loop 1440 to ensure amplitude drive signal 1210, quadrature control drive signal 1220, and rate control drive signal 1230, respectively, have the same frequency as hemispherical resonator 1110.

FIG. 2 is a block diagram of a system 200 including two HRG devices (e.g., HRG 210 and HRG 260). Here, HRG 210 includes it own natural frequency ($\omega_{R1}$) (e.g., 4.1 kHz). As such, any signal (e.g., readout signal 215) output by HRG 210 would include frequency $\omega_{R1}$. Readout signal 215 is filtered by a bandpass filter 220 and transmitted to data processor 230. Any signal representing an angle ($\Delta\theta_1$) output by HRG 210 would include frequency $\omega_{R1}$. Moreover, any signal (e.g., a local oscillator signal) received by HRG 210 would likewise include frequency $\omega_{R1}$ since the frequency of each signal in HRG 210 is controlled by phase locked loop 240. In other words, the frequency ($\omega_{LO1}$) of the local oscillator signal is the same as the natural frequency ($\omega_{R1}$) of HRG 210 (i.e., $\omega_{LO1=\omega R1}$).

The operation of HRG 260 is similar to the operation of HRG 210. However, due to the nature of HRGs, the natural frequency ($\omega_{R2}$) of HRG 260 is different from ($\omega_{R1}$). For example, $\omega_{R2}$ may be 4.03 kHz. In other words, $\omega_{LO1}=\omega_{R1}$ and $\omega_{LO2}=\omega_{R2}$, wherein $\omega_{LO1}$ and $\omega_{R1}$ include a different frequency from $\omega_{LO2}$ and $\omega_{R2}$ such that the signals representing angles $\Delta\theta_1$ and $\Delta\theta_2$ have different frequencies.

Thus, previous systems are complex from a hardware, firmware, and software point of view since each HRG has its own individual natural frequency. Since each HRG has its own individual natural frequency, synchronizing the output signals (e.g., $\omega_{R1}$ =4.11 KHz and $\omega_{R2}$ =4.07 KHz) from a plurality of HRG devices requires electronics incorporating a set of complex algorithms and computations. Often, the complex algorithms and computations omit important components from one or more signals from the HRG devices since estimating and/or rounding occurs in the algorithms and computations. As such, the resulting signals are not as accurate as they otherwise could be. Notably, these systems become even more complex when each HRG also includes 4.07 KHz) from a plurality of HRG devices requires electronics incorporating a set of complex algorithms and computations. Often, the complex algorithms and computations omit important components from one or more signals from the HRG devices since estimating and/or rounding occurs in the algorithms and computations. As such, the resulting signals are not as accurate as they otherwise could be. Notably, these systems become even more complex when each HRG also includes its own accelerometer (not shown) to measure the speed of change in direction for its associated HRG. Thus, there is a need for systems and methods to synchronize output signals from a plurality of HRG devices in a less complex and more accurate manner.

SUMMARY OF THE INVENTION

The present invention accomplishes the above goal for two or more gyroscopes in communication with one another. By its nature, each gyroscope outputs a signal at its own individual natural frequency ($\omega_R$). For a hemispherical resonator gyroscope (HRG), the natural frequency is about 4.1 kHz for a 30 millimeter resonator. However, the techniques of the present invention are equally applicable to resonate bodies having other natural frequencies.

Each HRG also includes an associated phase locked loop in communication with the HRG. A reference signal including a reference frequency ($\omega_{LO}$) from each phase locked loop is added to the output signal of its associated HRG by a signal mixer to form an intermediate frequency IF signal including a ($\omega_{LO}-\omega_R$) component and a ($\omega_{LO}+\omega_R$) component.

Each HRG's natural frequency is measured and the frequency $\omega_{LO}$ is determined by adding $\omega_R$ to a pre-determined operating frequency. In one exemplary embodiment, the pre-determined operating frequency is 8.0 kilohertz (kHz). Thus, for example, if the natural frequency of an HRG is 4.06 kHz and the pre-determined operating frequency is 8.0 kHz, $\omega_{LO}$ will be 12.06 kHz (i.e., 4.06 kHz+8.0 kHz).

The ($\omega_{LO}+\omega_R$) component is filtered by a bandpass filter such that the IF signal substantially only includes the ($\omega_{LO}-\omega_R$) component, or the pre-determined operating frequency. Each IF signal is transmitted to a respective inertial data processor, from which each output from the inertial data processors is compared to one another to determine a direction for the system.

Thus, the present invention provides a directional system utilizing two or more self-contained gyroscopes that is more accurate and cheaper to manufacture and maintain than previous systems. Notably, embodiments of the directional system include three HRG devices such that an x-coordinate, a y-coordinate, and z-coordinate can be determined.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE INVENTION

Reference will now be made to various exemplary embodiments of the invention, which are illustrated in the accompanying figures. While the invention is described with reference to these exemplary embodiments, these embodiments do not limit the invention. On the contrary, the invention is intended to cover alternatives, modifications, and equivalents which may be included within the spirit and scope of the invention as defined by the appended claims.

In the following detailed description, numerous specific details are set forth to provide a thorough understanding of the present invention. However, it will be understood by one of ordinary skill in the art that the present invention is capable of being practiced without these specific details. In other instances, well known methods, procedures, components, and circuits have not been described in detail so as not to unnecessarily obscure the important aspects of the present invention.

Embodiments of the present invention provide systems and methods including a plurality of self-contained gyroscopes. Since each gyroscope is self-contained, if a gyroscope within the system breaks and/or malfunctions, the gyroscope can be replaced without needing to re-calibrate and/or adjust any other components of the system. Thus, the invention allows a system to be manufactured and/or repaired cheaper than current systems incorporating a plurality of gyroscopes.

Figure 1:
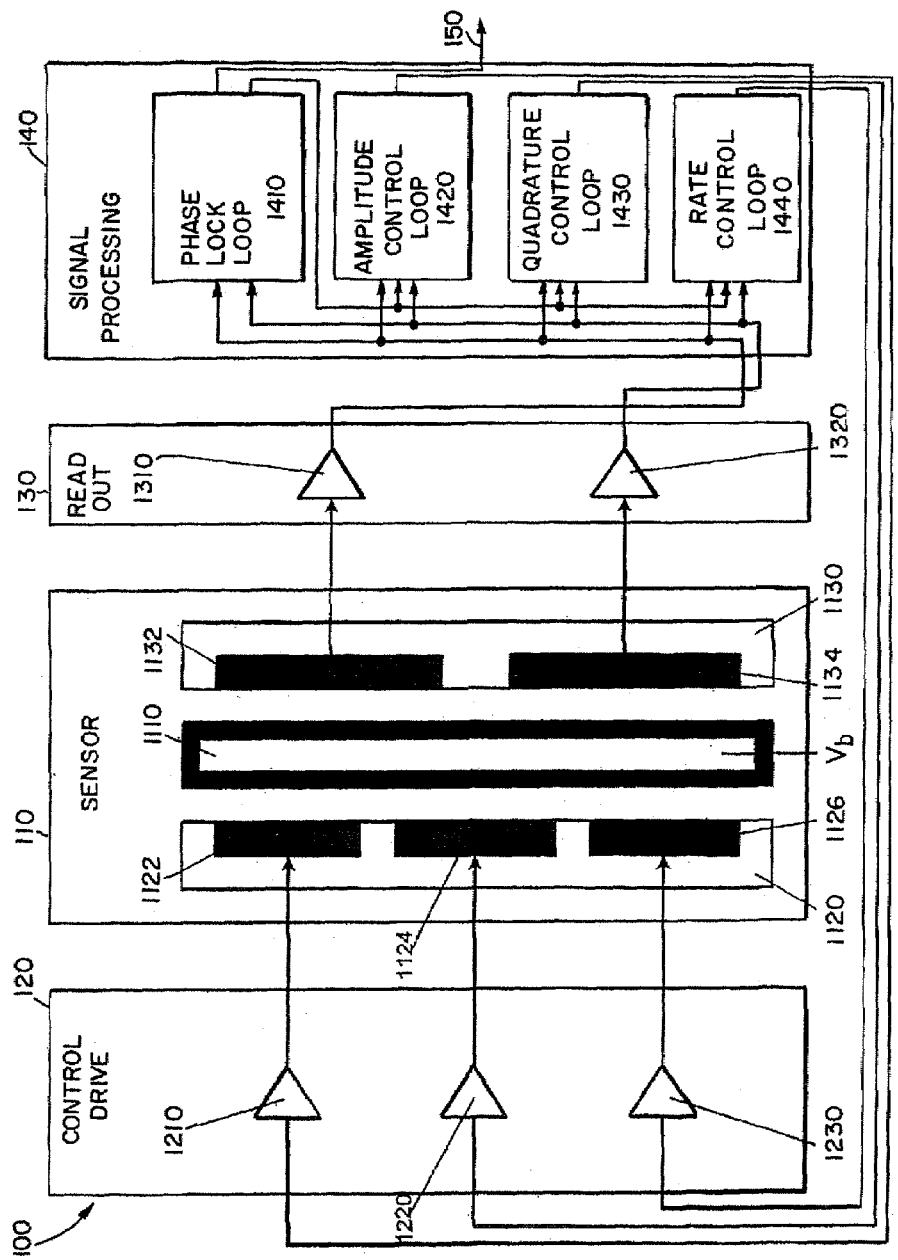
FIG. 1 is a block diagram of a prior art hemispherical resonator gyroscope (HRG)
Figure 2:
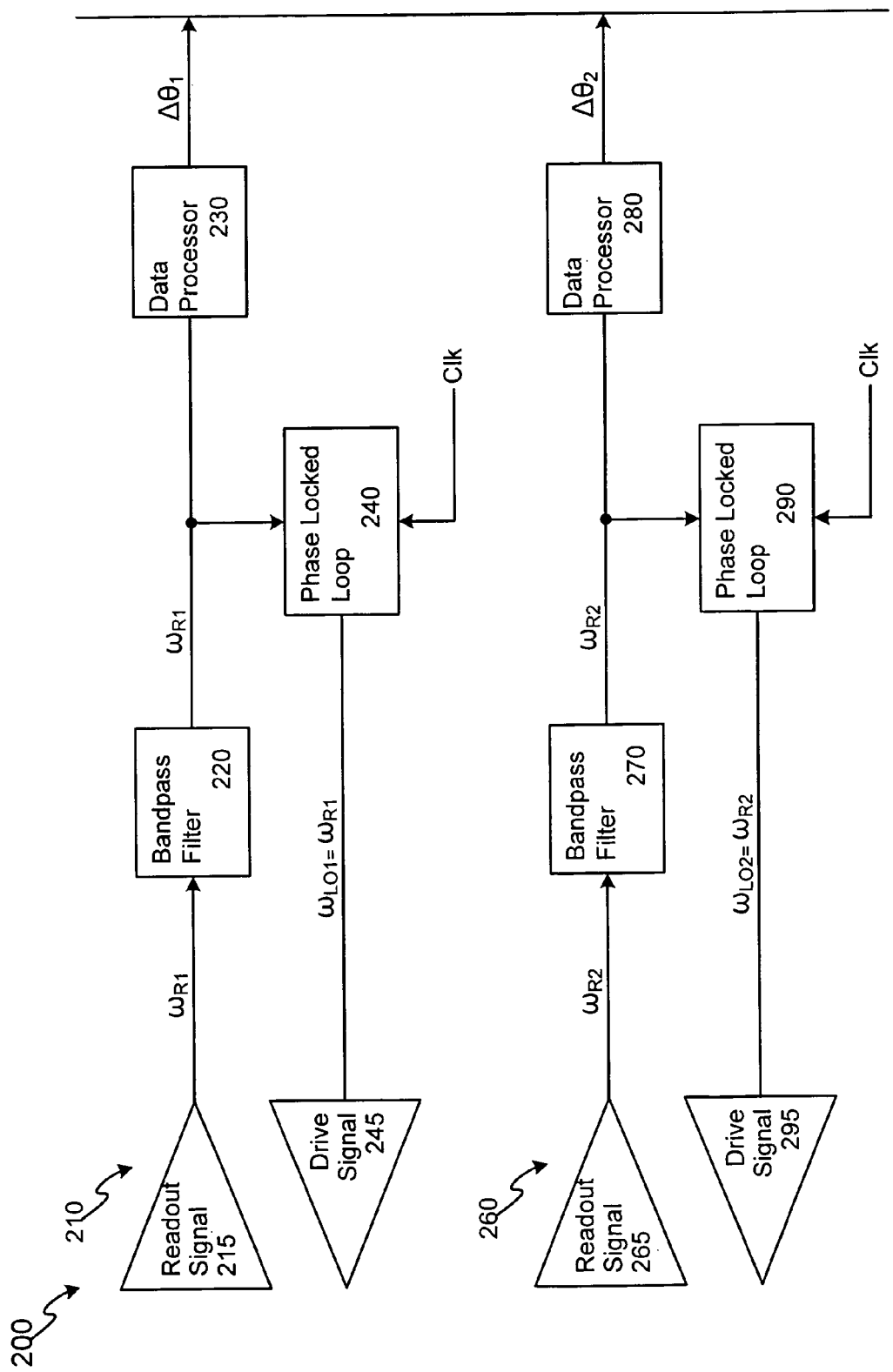
FIG. 2 is a block diagram of a signal flow for a prior art system including two HRG devices.
Figure 3:
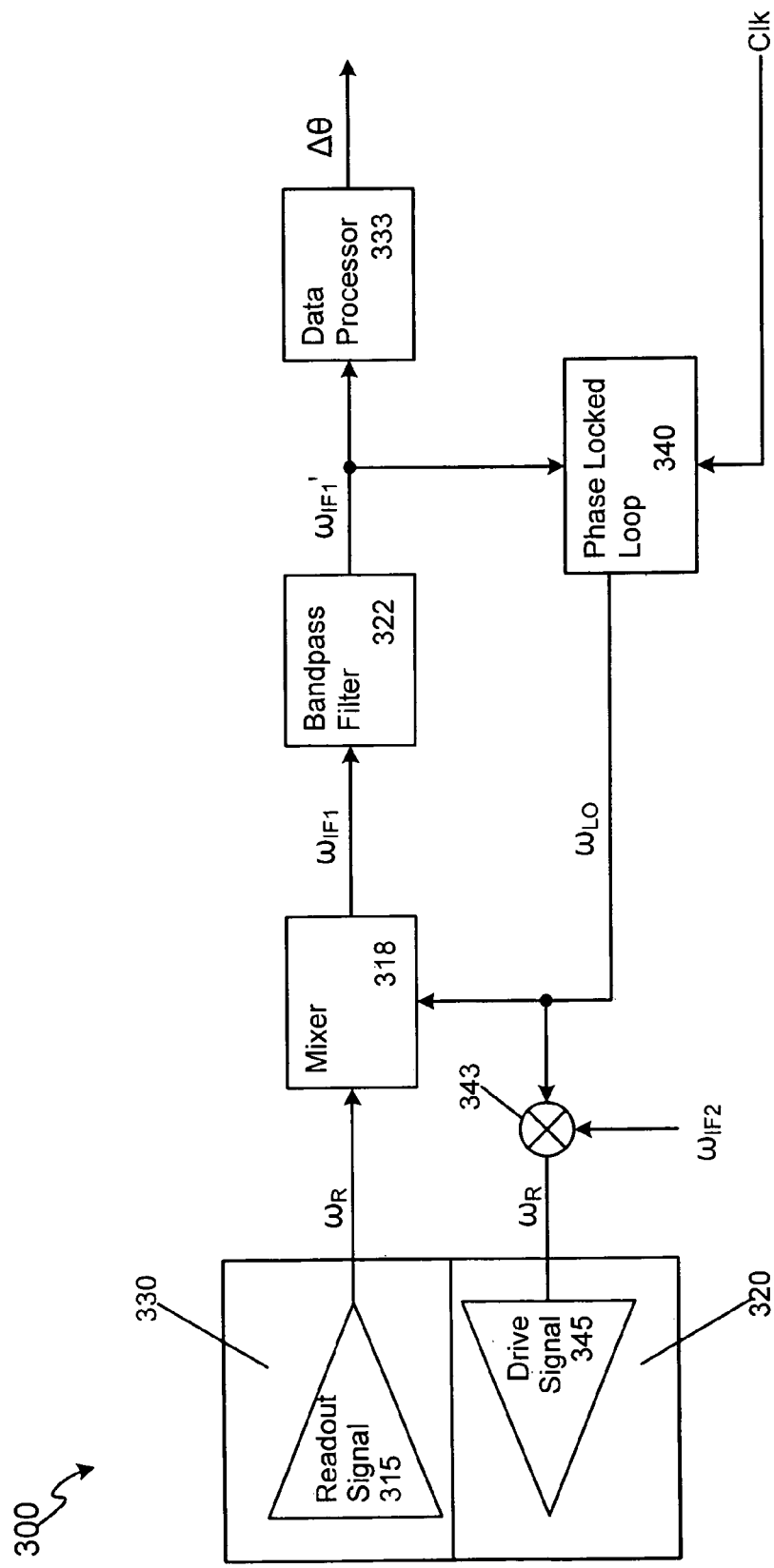
FIG. 3 is a block diagram of an HRG in accordance with an exemplary embodiment of the present invention.

FIG. 3 is a block diagram of a gyroscope 300 in accordance with an exemplary embodiment of the present invention. Gyroscope 300 may be any hardware and/or software suitably configured to produce a signal to indicate a direction gyroscope 300 is oriented. As such, gyroscope 300 may be any gyroscope known in the art or developed in the future. In accordance with one exemplary embodiment of the invention, gyroscope 300 is a hemispherical resonator gyroscope (HRG) manufactured by Northrop Grumman Corporation of Los Angeles, Calif. As such, gyroscope 300 may be similar to HRG 100 discussed above with reference to FIG. 1.

In one exemplary embodiment of the invention, gyroscope 300 includes a readout section 330, similar to readout section 130 discussed above, to produce a readout signal 315 similar to X readout signal 1310 and/or Y readout signal 1320 discussed above. Readout signal 315 includes a natural frequency ($\omega_R$) of gyroscope 300. As discussed above, $\omega_R$ is the individual operating frequency of gyroscope 300 and includes a frequency of approximately 4.1 kilohertz (kHz). However, gyroscopes with other natural operating frequencies are contemplated by the invention.

Readout section 330 is in communication with a mixer 318, wherein readout section 330 is also configured to transmit readout signal 315 to mixer 318. Mixer 318 may be any hardware and/or software suitably configured to combine two or more signals. As such, mixer 318 may be any mixer known in the art or developed in the future. In accordance with one exemplary embodiment of the invention, mixer 318 is configured to combine readout signal 315 with a reference signal with a pre-determined reference frequency ($\omega_{LO}$) to form an intermediate frequency (IF) signal having a ($\omega_{LO}-\omega_R$) component and a ($\omega_{LO}+\omega_R$) component. The reference signal is received from a phase locked loop (discussed below) and $\omega_{LO}$ is determined by adding $\omega^R$ to a desired operating frequency.

For example, if the desired operating frequency is 8.0 kHz and $\omega_R$ is 4.15 kHz, $\omega_{LO}$ is 12.15 kHz (i.e., 8.0 kHz+4.15 kHz). Thus, in this example, when readout signal 315 is combined with the reference signal, the IF signal includes a frequency ($\omega_{IF1}$) having a 16.3 kHz component ($\omega_{LO}+\omega_R$) and an 8.0 kHz component ($\omega_{LO}-\omega_R$).

In accordance with one embodiment, mixer 318 is in communication with a bandpass filter 322, wherein bandpass filter 322 may be any hardware and/or software suitably configured to allow components of a signal having a pre-determined frequency to pass through. As such, bandpass filter 322 may be any bandpass filter known in the art or developed in the future. In accordance with one exemplary embodiment of the invention, bandpass filter 322 is configured to receive the IF signal and allow substantially only the ($\omega_{LO}-\omega_R$) component to pass through. In other words, the high frequency component ($\omega_{LO}+\omega_R$) is filtered from the IF signal. Thus, in the example above, the IF signal includes a frequency ($\omega_{IF1}'$) of 8.0 kHz after passing through bandpass filter 322.

Bandpass filter 322 is in communication with a data processor 333, wherein data processor 333 is any hardware and/or software to process the IF signal having frequency $\omega_{IF}'$. In accordance with one exemplary embodiment, data processor 333 is configured to provide a representation of an angle ($\Delta\theta$) from gyroscope 300. Furthermore, the representation may be of an angle on an X-axis, Y-axis, or Z-axis.

Furthermore, bandpass filter 322 is in communication with a phase locked loop 340, wherein phase locked loop 340 is any hardware and/or software suitably configured to receive the IF signal and maintain a constant phase angle (i.e., lock) on the frequency of the IF signal. As such, phase locked loop 340 may be any phase locked loop known in the art or developed in the future. In accordance with one exemplary embodiment of the invention, phase locked loop 340 produces the reference signal including the frequency $\omega_{LO}$ discussed above. Furthermore, phase locked loop 340 is in communication with mixer 318 and a signal inverter 343, and provides the reference signal to mixer 318 and signal inverter 343.

Signal inverter 343 may be any hardware and/or software suitably configured to combine two or more signals. As such, signal inverter 343 may be any signal inverter known in the art or developed in the future. In accordance with one exemplary embodiment, signal inverter 343 is configured to receive the reference signal having frequency $\omega_{LO}$ from phase locked loop 340 and receive a second IF signal with a frequency $\omega_{IF2}$ from a source (not shown), wherein $\omega_{IF2}$ includes a frequency ($\omega_{LO}+\omega_R$). Furthermore, signal inverter 343 is configured to combine the reference signal with the second IF signal to form a drive signal 345 and transmit drive signal 345 to a control drive segment 320 similar to control drive segment 120 discussed above.

Notably, when signal inverter 343 combines the reference signal with the second IF signal, drive signal 345 includes a frequency ($\omega_R$) (i.e., $\omega_{LO}+\omega_R-\omega_{LO}$). Thus, drive signal 345 will include the natural frequency of gyroscope 300.

Figure 4:
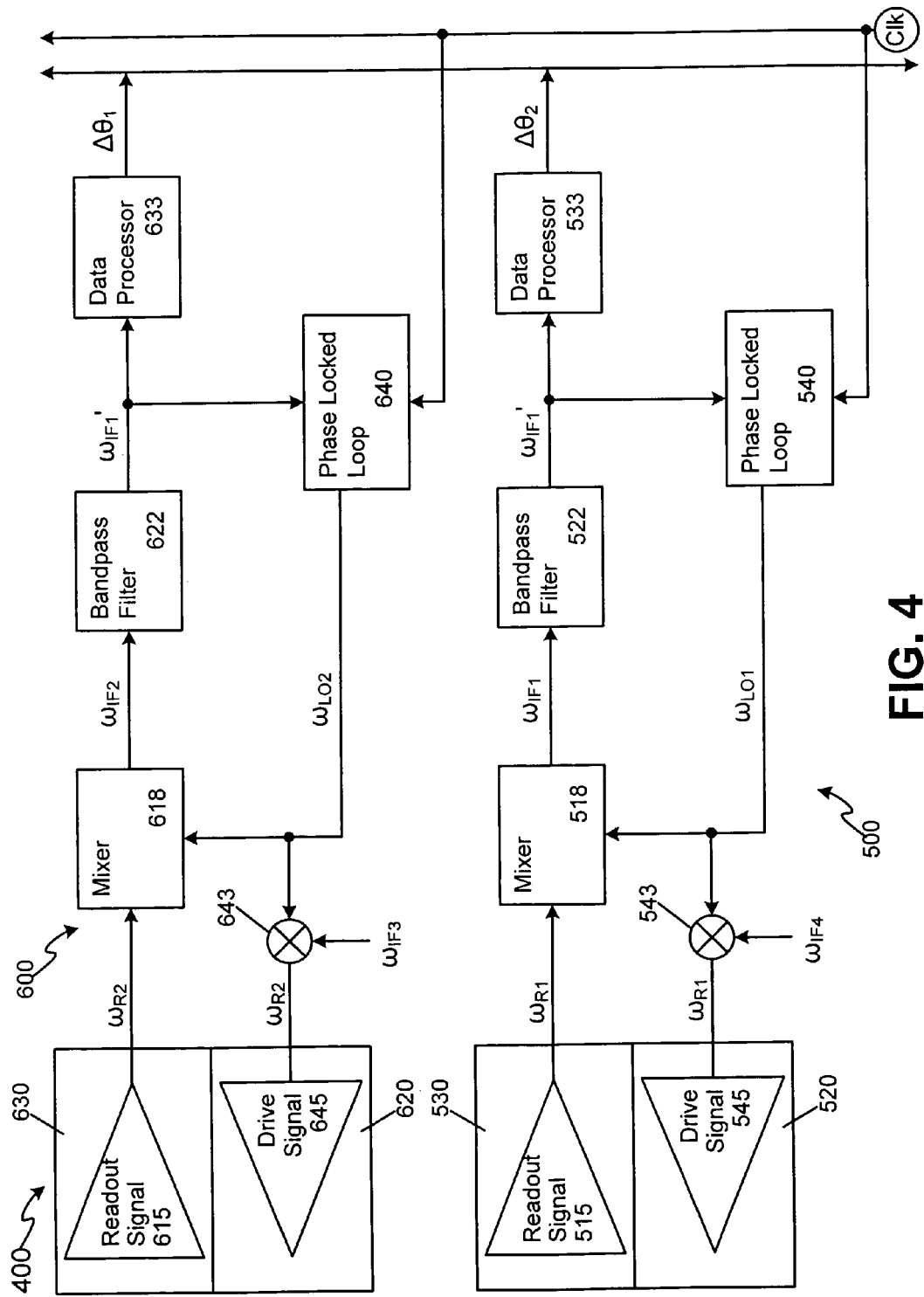
FIG. 4 is a block diagram of an exemplary embodiment of a system including two or more HRG devices.

FIG. 4 is a block diagram of an exemplary embodiment of a system 400 including a gyroscope 500 and a gyroscope 600 similar to gyroscope 300 discussed above. Gyroscope 500 includes a readout section 530, a mixer 518, a bandpass filter 522, a data processor 533, a phase locked loop 540, and a signal inverter 543 configured similar to readout section 330, mixer 318, bandpass filter 322, data processor 333, a phase locked loop 340, and signal inverter 343 discussed above, respectively. Furthermore, gyroscope 600 includes a readout section 630, a mixer 618, a bandpass filter 622, a data processor 633, a phase locked loop 640, and a signal inverter 643 configured similar to readout section 330, mixer 318, bandpass filter 322, data processor 333, a phase locked loop 340, and signal inverter 343 discussed above, respectively. Since gyroscopes typically operate at their own individual natural frequencies, gyroscope 500 and gyroscope 600 have natural frequencies different from one another. Thus, $\omega_{R1}$ and $\omega_{R2}$ are different frequencies.

In accordance with one exemplary embodiment of the invention, system 400 is configured to operate in the range of about 100 Hz to about 100 kHz. In another embodiment, system 400 is configured to operate at approximately 8.0 kHz. As such, since $\omega_{R1}$ and $\omega_{R2}$ are different frequencies, phase locked loops 540 and 640 are configured to produce reference signals including frequencies (e.g., $\omega_{LO1}$ and $\omega_{LO2}$) different from one another. For example, if $\omega_{R1}$ is 4.18 kHz and $\omega_{R2}$ is 4.09 kHz, $\omega_{LO1}$ will be 12.18 kHz (8.0 kHz+4.18 kHz) and $\omega_{LO2}$ will be 12.09 kHz (8.0 kHz+4.09 kHz). Thus, the frequency ($\omega_{IF1}$) of the IF signal in gyroscope 500 will include an 8.0 kHz component (i.e., 12.18 kHz−4.18 kHz) and a 16.36 kHz component (i.e., 12.18 kHz+4.18 kHz), and the frequency ($\omega_{IF2}$) of the IF signal in gyroscope 600 will include an 8.0 kHz component (i.e., 12.09 kHz−4.09 kHz) and a 16.18 kHz component (i.e., 12.09 kHz+4.09 kHz).

Furthermore, when the IF signal in gyroscope 500 and the IF signal in gyroscope 600 pass through bandpass filter 522 and bandpass filter 622, respectively, the high frequency component ($\omega_{LO}+\omega_R$) of each signal is filtered such that each resulting IF signal includes a frequency ($\omega_{IF1}'$) of 8.0 kHz. Each respective IF signal is transmitted to a respective data processor (i.e., data processors 533 and 633) and, thus, gyroscopes 500 and 600 each output an 8.0 kHz IF signal representing an angle (i.e., $\Delta\theta_1$ and $\Delta\theta_2$, respectively).

In addition, gyroscopes 500 and 600 each include a signal inverter (i.e., signal inverters 543 and 643, respectively) to combine the reference signal with a respective second IF signal to form a drive signal (i.e., drive signals 545 and 645, respectively) having a frequency equal to the natural operating frequency of its respective gyroscope. In other words, drive signal 545 includes a frequency of 4.18 kHz (i.e., $\omega_{LO1}+\omega_{R1}\omega_{LO1}$) and drive signal 645 includes a frequency of 4.09 kHz (i.e., $\omega_{LO2}+\omega_{R2}-\omega_{LO2}$) to match the natural frequencies of gyroscope 500 (i.e., $\omega_{R1}$) and gyroscope 600 (i.e., $\omega_{R2}$), respectively.

Since each of gyroscopes 500 and 600 are essentially self-contained, each of these gyroscopes can be replaced without affecting the output and performance of the other gyroscope. Moreover, system 400 may be assembled without needing to calibrate gyroscopes 500 and 600 since they are individual gyroscopes configured to operate at the same frequency. Thus, system 400 may be compatible with numerous different systems and/or systems manufactured by numerous different manufacturers.

Figure 5:
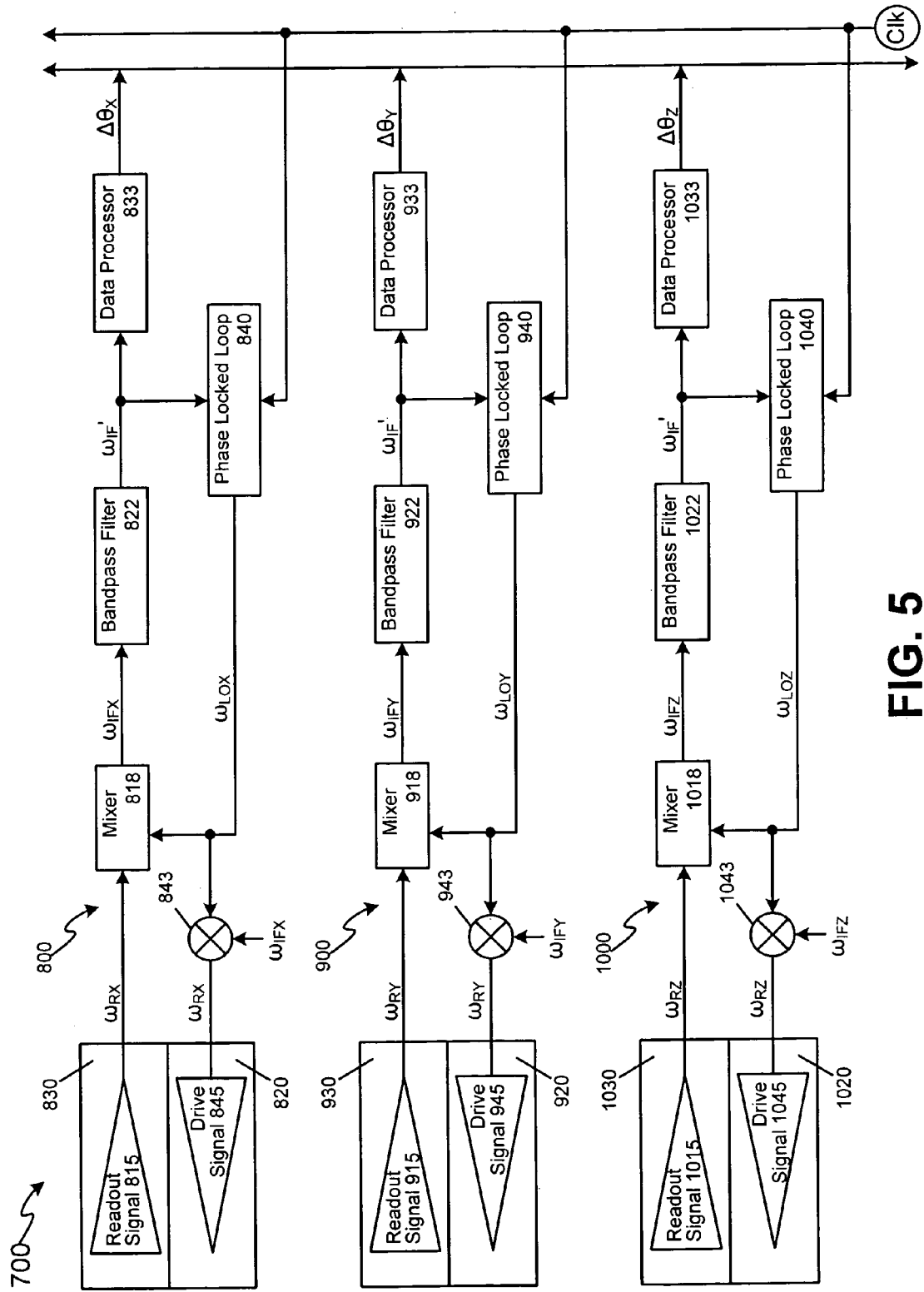
FIG. 5 is a block diagram of one exemplary embodiment of a system including three HRG devices for determining an x-coordinate, a y-coordinate, and a z-coordinate of an apparatus.

FIG. 5 is a block diagram of one exemplary embodiment of a system 700 including three gyroscopes (e.g., gyroscope 800, gyroscope 900, and gyroscope 1000 for determining an x-coordinate, a y-coordinate, and a z-coordinate similar to system 400 discussed above. Gyroscope 800 includes a readout section 830, a mixer 818, a bandpass filter 822, a data processor 833, a phase locked loop 840, and a signal inverter 843 configured similar to readout section 330, mixer 318, bandpass filter 322, data processor 333, a phase locked loop 340, and signal inverter 343 discussed above, respectively. Furthermore, gyroscope 900 includes a readout section 930, a mixer 918, a bandpass filter 922, a data processor 933, a phase locked loop 940, and a signal inverter 943 configured similar to readout section 330, mixer 318, bandpass filter 322, data processor 333, a phase locked loop 340, and signal inverter 343 discussed above, respectively. Moreover, gyroscope 1000 includes a readout section 1030, a mixer 1018, a bandpass filter 1022, a data processor 1033, a phase locked loop 1040, and a signal inverter 1043 configured similar to readout section 330, mixer 318, bandpass filter 322, data processor 333, a phase locked loop 340, and signal inverter 343 discussed above, respectively. As discussed above, gyroscope 800, gyroscope 900, and gyroscope 1000 have natural frequencies different from one another.

Similar to the discussion above, $\omega_{RX}$, $\omega_{RY}$, and $\omega_{RZ}$ are different frequencies, and $\omega_{LOX}$, $\omega_{LOY}$, and $\omega_{LOZ}$ are different frequencies. However, after $\omega_{RX}$ is added to $\omega_{LOX}$ by mixer 818, $\omega_{RY}$ is added to $\omega_{LOY}$ by mixer 918, and $\omega_{RZ}$ is added to $\omega_{LOZ}$ by mixer 1018 to form IF signals including a $\omega_{LOX}-\omega_{RX}$ component, a $\omega_{LOY}-\omega_{RY}$ component, and a $\omega_{LOZ}-\omega_{RZ}$ component, respectively, and each IF signal is filtered by a bandpass filter (i.e. bandpass filters 822, 922, and 1022, respectively), each resulting IF signal includes the same frequency ($\omega_{IF}'$). Thus, each of gyroscopes 800, 900, and 1000 operate at the same frequency and are capable of providing signals representing angles (i.e., $\Delta\theta_X$, $\Delta\theta_Y$, and $\Delta\theta_Z$) for three planes (i.e., x-plane, y-plane, and z-plane).

Since each of gyroscopes 800, 900, and 1000 are essentially self-contained, any of these gyroscopes can be replaced without affecting the output and performance of the other gyroscopes. Moreover, system 700 may be assembled without needing to calibrate gyroscopes 800, 900, and 1000 since they are individual gyroscopes configured to operate at the same frequency. Thus, system 700 may be compatible with numerous different systems and/or systems manufactured by numerous different manufacturers.

Figure 6:
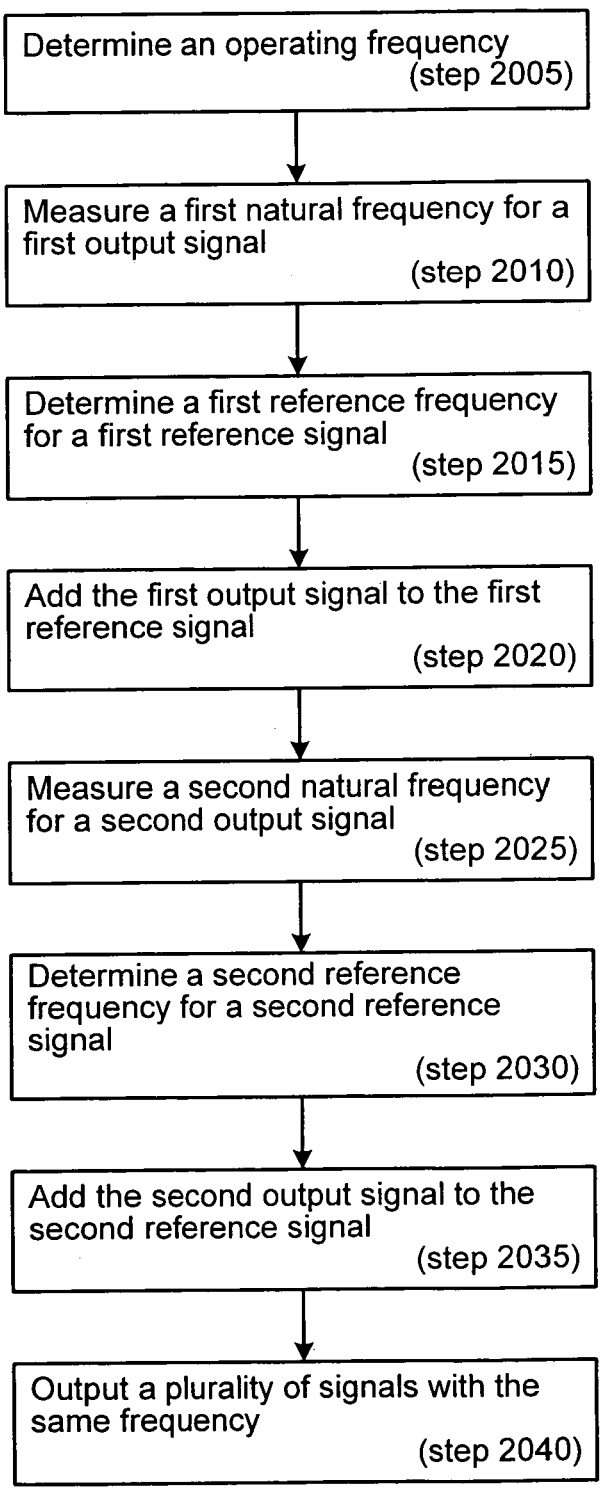
FIG. 6 is a flow diagram of one exemplary embodiment of a method to control a system including two or more gyroscopes.

FIG. 6 is a flow diagram of one exemplary embodiment of a method 2000 to control two or more gyroscopes. In accordance with an exemplary embodiment of the invention, method 2000 initiates by determining an operating frequency for the gyroscopes (step 2005). In one aspect of the invention, the operating frequency is in the range of about 100 Hz to about 100 kHz. In another aspect of the invention, the operating frequency is about 8.0 kHz.

Method 2000 also includes the step of measuring a first natural frequency ($\omega_{R1}$) of a signal output by a resonator of a first gyroscope (e.g., gyroscope 300, 500, 600, 800, 900, or 1000) (step 2010). Once the operating frequency is determined and the first natural frequency is known, method 2000 includes the step of determining a first reference frequency $\omega_{LO1}$ for a first reference signal (step 2015). In accordance with one exemplary embodiment of the invention, the first reference frequency is determined by adding the operating frequency to the first natural frequency. For example, if the operating frequency is 8.0 kHz and the first natural frequency is 4.12 kHz, the first reference frequency is 12.12 kHz. Thus, in general terms, the reference frequency may be referred to as 12.xx kHz since the "xx" is determined by the natural frequency.

After the operating frequency, the natural frequency, and the reference frequency are determined, the first output signal and the first reference signal are combined to form an IF signal including a $\omega_{LO1}-\omega_{R1}$ component (step 2020). Doing the calculation, the IF signal will include a component having a frequency of 8.0 kHz (i.e., the desired operating frequency). Thus, the first gyroscope operates at a pre-determined frequency.

Method 2000 repeats steps 2010 through 2020 for a second gyroscope (steps 2025 through 2035). However, because of the nature of gyroscopes, the natural frequency of the resonator for the second gyroscope will be different than the natural frequency of the resonator for the first gyroscope. As such, for the second gyroscope to operate at the pre-determined operating frequency (e.g., 8.0 kHz), the frequency of the second reference signal will be different than the frequency of the first reference signal. However, once the second output signal is added to the second reference signal, the resulting IF signal will include a component $\omega_{LO2}-\omega_{R2}$ that is equal to the pre-determined operating frequency (i.e., 8.0 kHz). Thus, method 2000 includes the step of outputting a plurality IF signals with substantially the same frequency (step 2040).

Notably, the above apparatus, systems, and methods may have been described as including specific frequencies. However, one skilled in the art will appreciate that each apparatus, system, and method may operate at any number of frequencies and at frequencies higher and/or lower than the specific frequencies referenced. As such, the invention is not to be limited by the disclosure of specific frequencies, examples, and embodiments.

Furthermore, other advantages, benefits, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A system containing a plurality of gyroscopes, each gyroscope operating at a different natural frequency ($\omega_R$), each gyroscope in the system comprising:
   a mixer receiving output signals from a gyroscope at the natural frequency of operation ($\omega_R$) and reference signals at a frequency ($\omega_{LO}$) that is the sum of the natural frequency of operation $\omega_R$) of the gyroscope and a predetermined operating frequency for the system, the mixer combining the signals from the gyroscope ($\omega_R$) with the reference signals $\omega_{LO}$ to form a signal ($\omega_{IF}$) having a ($\omega_{LO}+\omega_R$) and a ($\omega_{LO}-\omega_R$) component;
   a filter receiving the components of the signal ($\omega_{IF}$) and removing the ($\omega_{LO}+\omega_R$) component leaving the ($\omega_{LO}-\omega_R$) component signals at the predetermined operating frequency for the system;
   a phase lock loop receiving a system clock signal and the ($\omega_{LO}-\omega_R$) component signals and generating the reference signals at a frequency ($\omega_{LO}$); and
   a data processor receiving the ($\omega_{LO}-\omega_R$) component signals from the filter at the operating frequency of the system and processing the received signals at the system operating frequency to generate a directional signal.

2. The system of claim 1, wherein the $\omega_{LO}-\omega_R$ component from the filter is about 8.0 kHz.

3. The system of claim 1, wherein each mixer is an analog mixer.

4. The system of claim 1, wherein each mixer is a digital mixer.

5. A method for controlling a plurality of gyroscopes operating together in a system, the steps of the method comprising:
   determining an operating frequency for all the gyroscopes in the system;
   measuring natural frequency of an output signal from a first gyroscope;
   determining a first reference signal by summing the first measured natural frequency and the determined operating frequency;
   combining the first reference signal with an output signal from the first gyroscope to form a signal from the first gyroscope having the operating frequency;
   measuring the natural frequency of an output signal from a second gyroscope;
   determining a second reference signal by summing the second measured natural frequency and the determined operating frequency; and
   combining the second reference signal with an output signal from the second gyroscope to form a signal from the second gyroscope having the operating frequency.

6. The method of claim 5, wherein the first natural frequency and the second natural frequency are different frequencies.

7. The method of claim 6, wherein the first reference frequency and the second reference frequency are different frequencies.

* * * * *